Nov. 14, 1933.   R. BROOKS   1,935,108

STEAM AND FUME EXHAUST FOR COOKING UTENSILS, ETC

Filed July 28, 1932

INVENTOR
Russell Brooks
BY
ATTORNEY

Patented Nov. 14, 1933

1,935,108

UNITED STATES PATENT OFFICE 1,935,108

STEAM AND FUME EXHAUST FOR COOKING UTENSILS, ETC.

Russell Brooks, Noranda, Quebec, Canada, assignor of one-half to Thomas J. McManus, Noranda, Quebec, Canada Application July 28, 1932, Serial No. 625,478, and in Canada July 28, 1931

2 Claims. (Cl. 53—1)

This present invention relates to certain new and useful improvements in a steam and fume exhaust for cooking utensils etc.

The primary object of the invention resides in the provision of a steam and fume exhaust for cooking utensils etc., which serves to carry off the steam and fumes from cooking and utensils and the like during use thereof and exhaust the same into the fire for mixture with the products of combustion and thereby improve the combustion and completely consume the exhausted steam and fumes.

The invention has for another object the provision of a steam and fume exhaust for cooking utensils etc., of the character stated which is of extremely simple and inexpensive construction as well as highly efficient in use and may be readily built in or incorporated in cooking utensils and the like of conventional type without materially increasing the cost thereof or extensively altering the type or the process of manufacture of such products.

The invention has for a further object the provision of a steam and fume exhaust for cooking utensils etc., of the character stated which results in a pronounced improvement in the manufactured products in which it is incorporated and increases the efficiency thereof without materially increasing the cost of manufacture of the products and thereby makes it possible to retail the improved products at a popular price with good profit, thus providing a commercially attractive proposition.

To the accomplishment of these and related objects as shall become apparent as the description proceeds, the invention resides in the construction, combination and arrangement of parts as shall be hereinafter more fully described, illustrated in the accompanying drawing and pointed out in the claims hereunto appended.

The invention will be best understood and can be more clearly described when reference is had to the drawing forming a part of this disclosure, wherein like characters indicate like parts throughout the several views.

In the drawing:—

Figure 1:
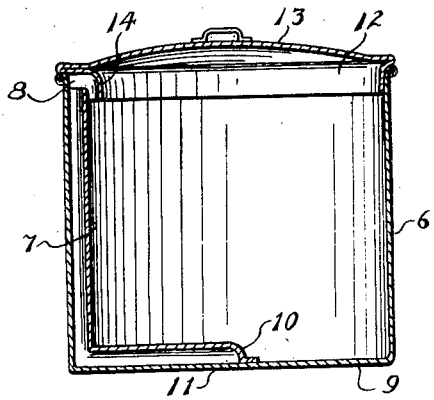
Figure 1 is a vertical section through a conventional cooking utensil with the present invention incorporated therein.
Figure 2:
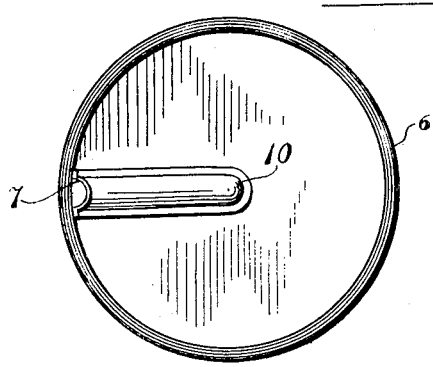
Figure 2 is a plan view of the utensil with the cover removed.
Figure 3:
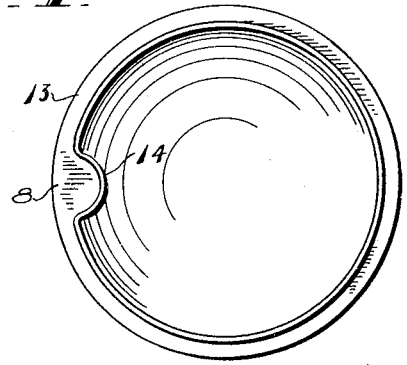
Figure 3 is a bottom plan of the cover.

Referring more in detail to the drawing, it is to be noted that in applying the invention to a conventional cooking utensil 6, a tube 7 is provided vertically on the inner face of the upstanding wall of the utensil 6 with the open upper end 8 of the tube 7 located adjacent the upper edge or top of the utensil 6. The tube 7 is continued to the bottom of the utensil 6 and turned and extended to the centre of the utensil bottom 9 with the lower end 10 of the tube 7 closed on the inner face of the utensil bottom 9, over the central opening 11 in said utensil bottom 9. Thus, when this improved utensil is positioned over an uncovered pot opening in the top of a cook range or the like, the steam and fumes from within the utensil 6 will pass downwardly through the tube 7, the opening 11 in the utensil bottom 9 and into the range for mixture and consumption with the products of combustion passing to the flue pipe. This not only results in complete consumption of the steam and fumes thus exhausted from the utensil 6 but also aids in producing improved combustion. In addition to the tube 7, the flange 12 of the cover 13 for the utensil 6 (and which flange 12 fits snugly in the utensil 6) has a pressed back portion 14 which loosely encircles and depends slightly around the open upper end 8 of the tube 7. This pressed back portion 14 of the cover flange 12 not only serves as means to assure proper positioning of the cover 13 on the utensil 6 but also assists in directing the steam and fumes in the utensil 6 into the upper end 8 of the tube 7 for exhaustion through said tube 7.

Figure 4:
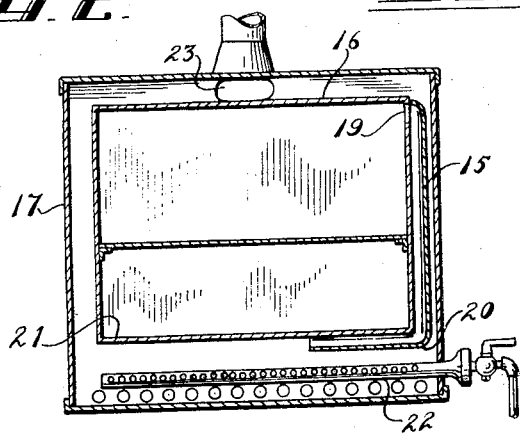
Figure 4 is a vertical section through a conventional gas oven with the invention incorporated therein.

In the modified form of the invention disclosed in Figure 4, and in which the invention is applied to a gas oven, the tube 15 is located vertically on the outer face of the over wall 16 and within the outer casing 17 spaced around the oven wall 16. The upper end of the tube 15 is closed and an opening 19 is provided in the oven wall 16 opposite the upper end 18 of the tube 15 to permit the steam and fumes in the oven to readily pass into and exhaust through the tube 15. The lower end 20 of the tube 15 is open and is turned to extend under the bottom 21 of the oven to discharge the exhausted steam and fumes over the oven burners 22 for mixture and consumption with the products of combustion, at this point. Thus, the exhausted steam and fumes from the oven as they are consumed with the products of combustion, pass with the same from the oven burners 22 around and over the oven wall 16 and out by way of the flue pipe 23, as found on conventional gas ranges and other stoves now in general use. It is apparent that the invention may be incorporated in this form in ovens of electrical stoves, oil stoves and the like with very little, if any, alteration. Furthermore, the principle of this invention may be applied to smelting furnaces and other places where fumes are to be drawn off.

From the foregoing description taken in connection with the accompanying drawing, it will be manifest that a steam and fume exhaust for cooking utensils, etc., is provided that will fulfill all the necessary requirements of such a device but as many changes could be made in the above description and many apparently widely different embodiments of the invention may be constructed within the scope of the appended claims without departing from the spirit or scope thereof, it is intended that all matters contained in the said accompanying specification and drawing, shall be interpreted as illustrative and not in a limitative or restrictive sense.

Having thus described the invention, what is claimed is:—

1. A steam and fume exhaust for cooking utensils etc., including a member in which steam and fumes are generated; a tube mounted on the inside of the upstanding wall and bottom of said member to exhaust the steam and fumes from within the latter to a point below the bottom of said member; the open receiving end of said tube terminating below the top rim of the upstanding wall of said utensil member; and a cover for said member having a depending flange entering said utensil, a portion of said flange formed to avoid and surround the receiving upper end of said tube and to assist in directing the steam and fumes into said tube.

2. A steam and fume exhaust for cooking utensils etc., including a cooking utensil having a steam and exhaust tube on its upstanding wall and its bottom to exhaust steam and fumes from the interior of said cooking utensil to a point below the centre of the bottom thereof; the open receiving end of said tube terminating near the top of said cooking utensil; and a cover for said cooking utensil with a depending flange entering said cooking utensil and provided with an inwardly pressed portion loosely surrounding the upper end of said tube for placing of the cover and directing the steam and fumes into said tube.

RUSSELL BROOKS. [L. S.]